Feb. 13, 1940.    P. DE V. D'AVAUCOURT    2,189,780
STONE SAWING MACHINE AND BLADE THEREFOR
Filed April 29, 1937    5 Sheets-Sheet 1
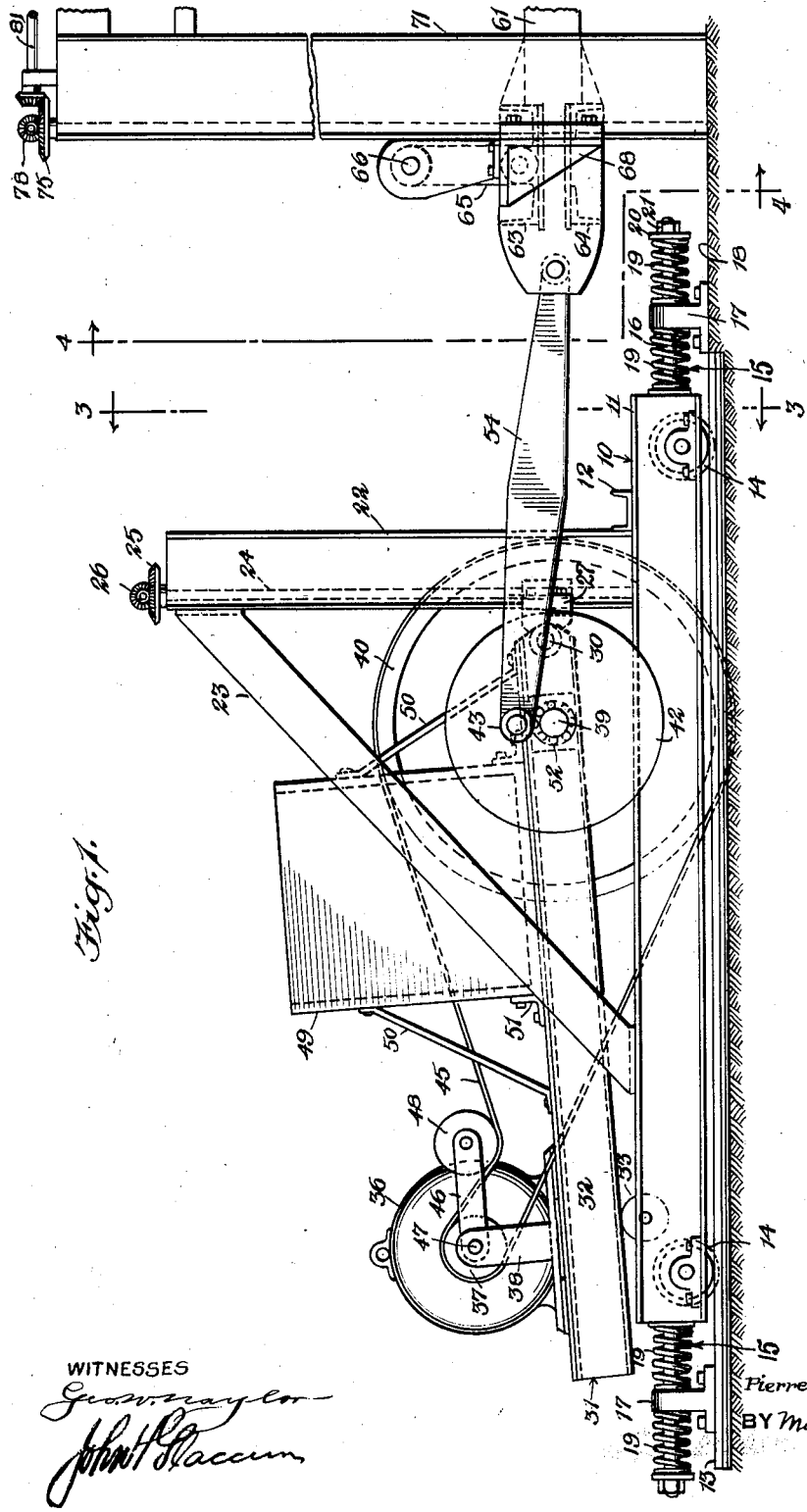
WITNESSES
INVENTOR
Pierre de Vitry D'Avaucourt
BY Munn Anderson & Liddy
ATTORNEYS

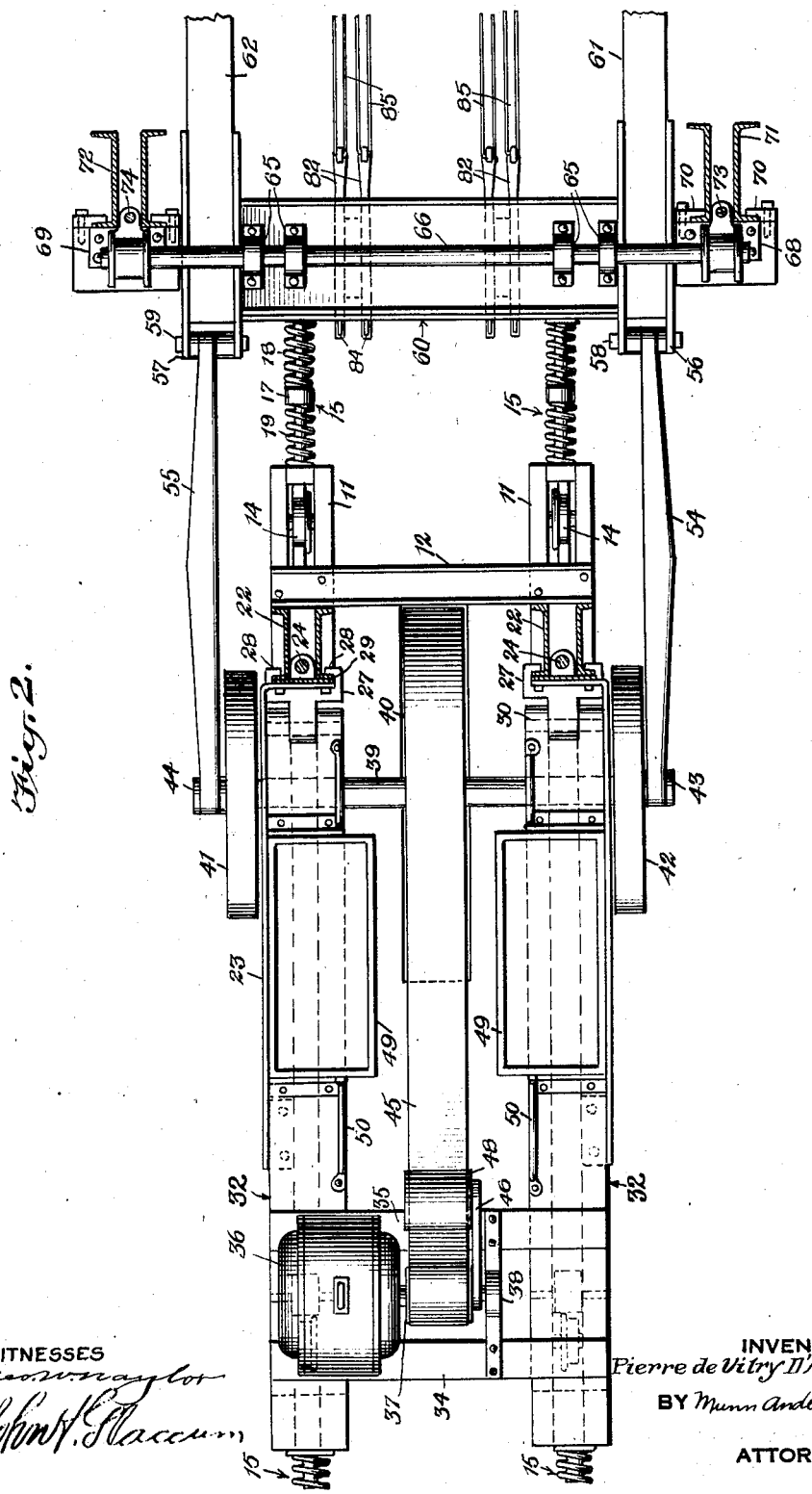

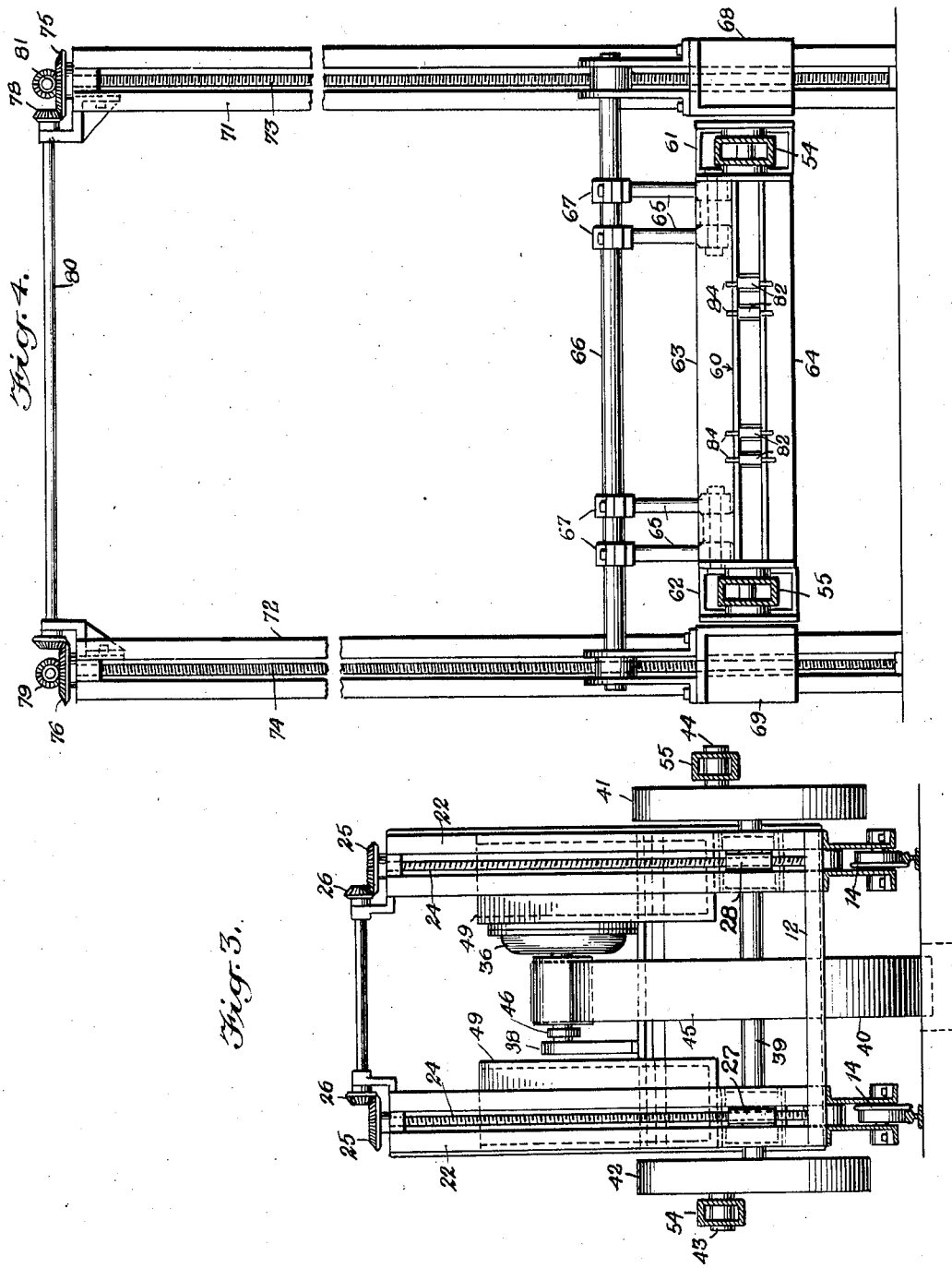

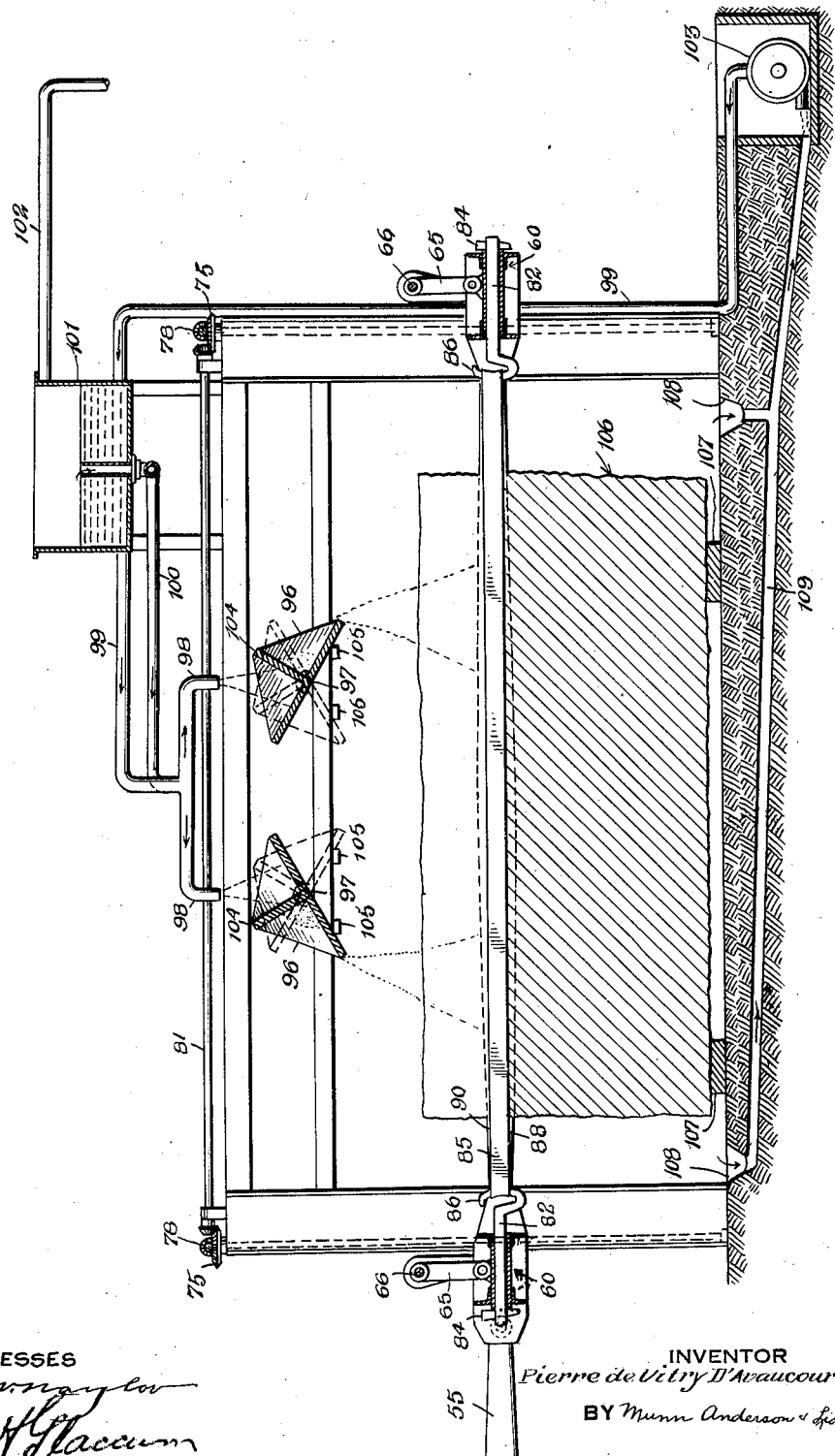

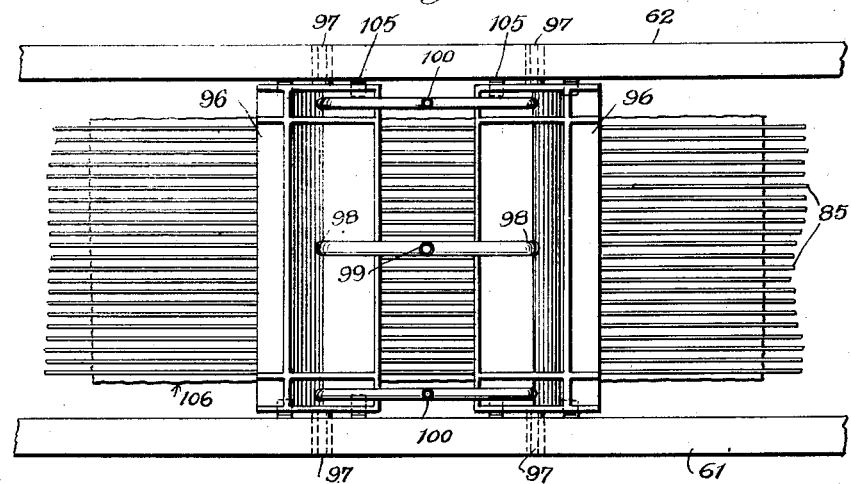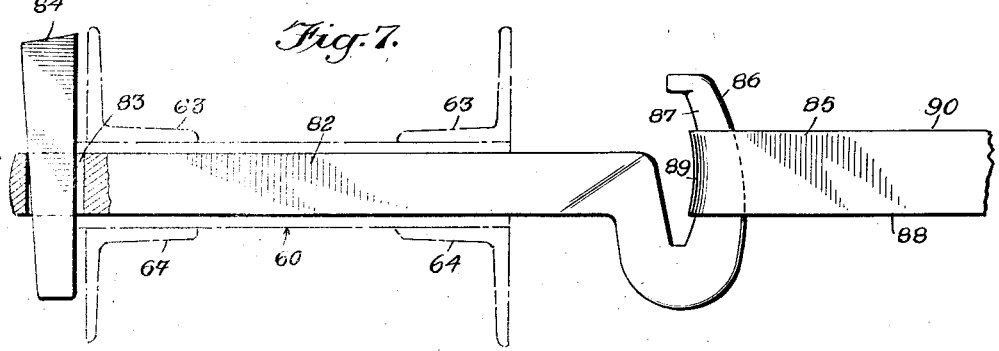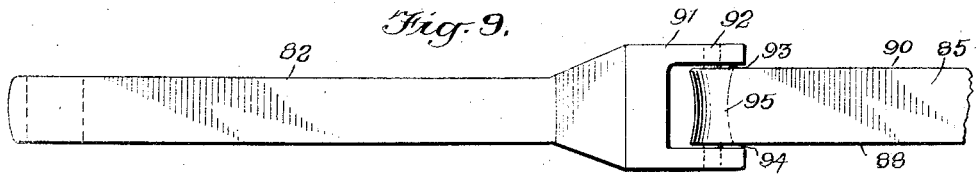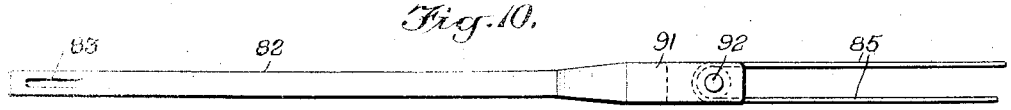

Patented Feb. 13, 1940

2,189,780

UNITED STATES PATENT OFFICE 2,189,780

STONE SAWING MACHINE AND BLADE THEREFOR

Pierre de Vitry d'Avaucourt, Astoria, N. Y.

Application April 29, 1937, Serial No. 139,692
In Spain May 23, 1936

8 Claims. (Cl. 125—16)

This invention relates to sawing machines and more particularly, to that type of sawing machine known as a gangsaw and used particularly in sawing marble, granite, and similar materials. These saws are usually constructed on a frame carrying from ten to two hundred blades, which frame is operated by an alternating arm over the material to be sawed.

At the present time, the blades used in these saws consist of a strip of steel which is placed in the frame under a tension of about four thousand pounds per blade. A great number of blades are used on a single frame or rack. The tension upon such a rack is very great and consequently it is essential that the rack be very strongly constructed and of great weight. A rack of this weight necessarily requires a great deal of power to move it back and forth and its rate of movement is very slow.

The blades used in the present gangsaw are fastened to the rack by means of a hole in the end thereof and through which a steel key is inserted. This form of fastening necessitates the use of blades from three to four inches wide and from one-eighth to three-sixteenths of an inch thick, and places the greatest tension therefore on the center of the blade rather than on the contact edges where it should be. The result is that the tension on the contact edges not being as great as the tension in the center of the blades, the contact edge is more flexible and more easily deflected to the sides, and tends to wear more in the center than on the ends. This condition is accentuated due to the fact that in previous machines the motive power moving the rack is stationary, and consequently the rack must necessarily work at an angle when operating on the top of a slab of stone to be cut. The blades used in a saw of this type do not contain teeth and the cutting is really done by an abrasive, such as sand, steel grains, or other analogous materials fed through the blades by a stream of water.

As the blades wear in the middle, the tension on the contact surfaces throughout the length of the blade naturally varies and the blade is apt to break during the actual sawing of a block, thus necessitating replacement and causing delay in operation. Due to the present thickness of the blades used and the fact that an abrasive must be fed over them, considerable waste results. It will be appreciated that a blade three-sixteenths of an inch thick with an abrasive on its sides as well as on the contact edge thereof, will make a cut of from five-sixteenths to three-eighths of an inch thick. Considerable stone is wasted in the sawing and due to the vibration of the blades, and the unsteadiness of the contact point, it is impractical to cut slabs of stone less than an inch or seven-eighths of an inch thick.

An object of this invention is to provide a gangsaw and a blade therefor, which will overcome the disadvantages inherent in the present saws.

A further object of this invention is to provide a gangsaw which may be lighter in construction and which can be operated at a greatly increased speed.

Another object of this invention is to provide a gangsaw which will eliminate the vibration and wear and tear existing in the present devices used.

A still further object of the invention is to provide a gangsaw in which the tension on the blades may be controlled and placed at the proper point.

A still further object is to provide a gangsaw which will be more efficient in its operation and avoid waste and with which it will be possible to cut thinner slabs of stone with a smoother surface than heretofore.

With these and other objects in view, which will appear as the description proceeds, reference is had to the accompanying drawings:

Fig. 1 shows a side view of a portion of applicant's device in which the power portion of the saw is shown.

Fig. 2 is a top view of the same portion shown in Fig. 1 and also showing a portion of the rack in which the blades are placed.

Fig. 3 is a view taken on the line 3—3 of Fig. 1 in the direction indicated.

Fig. 4 is a view taken on the line 4—4 of Fig. 1 in the direction indicated.

Fig. 5 is a side view of the rack and supporting mechanisms in which the blades are placed.

Fig. 6 is a top view in section of a part of the device shown in Fig. 5.

Fig. 7 is a view showing the manner of fastening the saws into the rack.

Fig. 8 is a top view of the blades and hook shown in Fig. 7.

Figs. 9 and 10 are views of a modification of the parts shown in Figs. 7 and 8, one being a side view and one a top view.

Referring more specifically to the drawings in which the numbers represent the various parts, I provide a carriage 10, consisting of a series of longitudinal beams 11 with appropriate cross members 12. This carriage is mounted upon a track 13 by means of wheels 14. At either end of the carriage 10 are a plurality of shock absorbers 15. While any type of shock absorbers may be used, I have shown a rod 16 and stop 17 which stop 17 is firmly bolted to the track 13 or the foundation 18. On either side of the stop 17 mounted on the rod 16 are springs 19 held in place by the washer 20 and the nut 21. By tightening the nut 21 upon the rod 16 the tension of the shock absorbers 15 may be varied and the movement of the carriage 10 upon the track 13 limited. Mounted on each of the girders 11 is an upward-extending pillar 22 which is braced by means of the cross-girders 23 or by other suitable means.

Within each of the pillars 22 is a spirally-threaded screw 24 which is operated by a gear 25 which cooperates with a similar gear 26. Mounted on each of the spirally-threaded screws 24 are links 27. The links 27 have inwardly-extending edges 28 which are guided by outwardly-extending flanges 29 of the pillars 22, so that the turning of the column 24 by means of the gear 25 will cause the links 27 to be raised or lowered in accordance with the direction in which the spiral screw 24 is turned. The links 27 are pivoted at 20 to a frame 31. This frame 31 consists of a plurality of girders 32 and the opposite end of said frame rests upon the roller 33, which is positioned in the carriage 10, to allow the forward movement thereof when the links 30 are moved upwardly. The frame 31 is provided with a platform consisting of cross-pieces 34 and 35 upon which is positioned the motor 36 which is supplied with a belt pulley 37, supported by the upright 38. At the other end of the girders 32 is mounted an axle 39 which extends through said girders 32 and upon which there is mounted a center drive wheel 40. On the outer ends of said axle are mounted two crank discs 41 and 42 with crank pins 43 and 44. Running from the belt pulley 37 to the large drive wheel 40 is a belt 45 and extending from the upright 38 is an arm 46 pivoted to said upright at 47. On the end of said arm is a weighted pulley 48, which rests on the belt 45 to keep the proper tension on the belt and to allow for the extension of the belt when the frame 31 is tilted upwards. Also mounted on the frame 31 are a plurality of wells 49, supported by the braces 50 and the angle irons 51. These wells 49 are receptacles in which weights may be put to steady the machine and to vary the weight thereof.

The axle 39 is provided with roller bearings 52 or a similar type of bearing to insure smoothness of operation and to prevent vibration. Attached to the crank arms 43 and 44 are connecting arms 54 and 55 which in turn are pivoted at 56 and 57 by means of pins 58 and 59 to the rack 60. The rack 60 is generally rectangular in shape and consists of several longitudinal members 61 and 62 fixed thereunder and which are supplemented by the angle irons 63 and 64. The rack 60 is supported at either end by pivoted links 65 which depend from a cross bar 66. While in the drawing I have shown a knuckle 67 which is suitable for containing a bearing of Babbitt metal or suitable material any similar construction may be used. The cross bar 66 is supported on either end by slidable carriages 68 and 69, each of which have guiding members 70, bolted or otherwise fastened thereto, which guiding members extend around the flanges of the pillars 71 and 72. Inside the pillars 71 and 72 are spirally-threaded screws 73 and 74 operated by gears 75 and 76 and in turn operated by the gears 78 and 79 and the rod 80. As will be seen from Fig. 5, a similar construction is provided at both ends of the rack 60 so that the entire rack may be moved upward or downward by the operation of the screws 73 and 74 on either end of the rack. The screws 73 and 74, the rod 80 and the gears 78 and 79, as well as the screws 24, are operated mechanically by means not shown in the drawings, but which, with the exception of a portion of the screw 24, are common. With each movement of the rack 60 backwards and forwards a small lever is tripped which turns a rod operating the rods 80 and 81, thus gradually lowering the rack. This structure is common in the art and no claim of invention is made herein.

In the present invention, the frame 31 is likewise lowered by the operation of the screw 24 in the same manner. In addition to the automatic means of moving the screws 24, 73 and 74, ordinary mechanical means are supplied for raising and lowering the rack 60 and the frame 31.

The girders 63 and 64 are separated sufficiently to allow the insertion of saw-bearing arms 82. The arms 82 are usually made of steel or other suitable material and have at one end an opening for the reception of a wedge 84. The opposite end of the arm 82 is adapted to receive a blade 85.

In the past it has been customary to use single blades having a hole through the center thereof and fastened by a pin or a hook through the hole. This means for fastening does not give any way to control the tension on the edge of the blade. For this purpose I provide on the inner end of the arm 82 a concave surface which may be in the nature of a hook 86. The inner face 87 of the hook may be varied in accordance with the tension desired and curved so that the tension on the contact edge 88 and the blade 85 may be controlled. As shown in Fig. 7, the inner face of the hook 87 is slightly concave and consequently the tension on the contact edge 88 of the blade is greater than the tension at the point 89. I have found it advisable to keep the tension in both the contact edge 88 and the upper edge 90 of the blade greater at the central portion thereof as this prevents buckling.

The blade 85 may be a continuous strip of steel which is permanently fastened at one end to an arm and then stretched back and forth across the rack on the hooks 86 and fastened at its upper end to an arm 82. The ends of the blade 85 may be welded to an arm similar to 82 before the blade is stretched on the hooks.

After the blades have been brought from one hook to another, the wedges 84 are driven into the slots 83, thus tightening the tension on the blade sufficiently for the purpose. In view of the fact that the tension of the blade 85 may be controlled and extended along the contact edges, rather than through the central portions thereof, a much lighter blade may be used and it is not necessary to place as great a tension on the blade as was necessary where the blade was merely fastened by the driving of a pin through a hole in its center. Thus a thinner blade may be used with natural saving.

In Fig. 9 and Fig. 10, I have shown a modified form for use with a continuous blade. The arm 82 has a U-shaped end 91, with a pin 92 inserted therethrough. The pin 92 is concave on its surface, the upper surface 93 and the lower surface 94 being larger in the middle thereof, 95. This places a greater tension at the contact point 88 of the blade 85 and thus gives it a firmer cutting edge.

It will be appreciated that there are many obvious ways of fastening the blade, especially where a continuous strip of steel is used. However, the principle of my conceptive idea is to provide means for controlling the tension at the various points of the blade in order to present a firmer and more efficient contact edge.

There is supported, over the saw rack, a plurality of bins, 96. These bins are pivoted at 97 and are fed by several overhead spouts, 98. The spouts 98 connect two pipes 99 and 100. Pipe 100 is connected to a reservoir 101 which is fed by pipe 102. Pipe 99 runs to a pump 103, which forces sand or other abrasive material up through the pipe 99 and into the spouts 98. Water is also fed through the pipe 100 into the spouts 98, where it flows into the bins 96. The bins 96 are provided with a partition 104 and, as previously stated, are pivoted at 97. When one side of the bin has become sufficiently filled with water and sand to overcome the weight of the other side, the bin tilts until it is stopped by the stops 105, whereupon it dumps its mixture of water and sand over the saw blades, 85.

As is shown in Fig. 5, the block of stone 106, is set upon the supports 107. The rack 60 containing the saws is then placed over the block and the screws 24 are turned until the end of the frame 31 bearing the crank arms 43 and 44 is parallel with the rack. The motor 36 is then started and the automatic lowering mechanism previously mentioned is set in motion. The rack 60 will be alternately drawn and pushed and the blades 85 work on the block of stone 106 in a seesawing fashion. Sand or other abrasives mixed with water is allowed to flow from the bins 96 through the saw blades. As the blades 85 with the aid of the abrasive cut their way into the marble the rack 60 and the frame 31 are gradually lowered so that the rack 60 is always parallel to the ground and the end of the frame 31 is even with the rack.

In the machine previously used, there was no way of raising the motive power and consequently the rack 60 often had to be worked at an angle. Moreover, the pull of the arms 54 being from a position lower than the rack tended to put excess strain on one end of the rack and causes the machine to vibrate excessively.

As the excess water and sand flowing from the bins 96 falls to the ground, it is caught by the drains 108 where it is returned through the pipe 109 to the pump 103 for later use. Due to the means set forth herein for the controlling of the tension of the blades, a much thinner blade may be used with much less waste resulting at either side of the blade. Moreover, the tension of the blade being properly placed, a much cleaner line is cut. The blades can be placed closer together and it is possible to cut much thinner slabs of stone than heretofore. The resultant product is much smoother since the motive power is in line substantially with the rack and the action of the rack is much smoother. The speed of the machine is also increased considerably and the cost of construction thereof reduced.

I claim:

1. In a gangsaw having a rack, means for the reception of saw-bearing arms, saw blades on said arms, and means for exerting varied tension to different longitudinal areas of said blades said means comprising a contact face adapted to slidably engage the side of said blade.

2. In a gangsaw having a rack, means on said rack for the reception of saw-bearing arms, a continuous flexible blade fastened at one end and stretched back and forth across the rack on said arms, said blade being fastened at the other end, and means for controlling the tension of said blade.

3. In a gangsaw having a rack, a plurality of saw-bearing arms, concave contact faces on said arms, and a continuous blade stretched back and forth across said rack on said arms.

4. In a gangsaw, a rack, a plurality of arms positioned in said rack, contact faces on the end of said arms, and a continuous saw blade stretched back and forth across said rack and engaging said contact faces.

5. In a gangsaw having a rack, means on said rack for the reception of saw-bearing arms, a continuous flexible blade fastened at one end to an arm and stretched back and forth across the rack on said arms, said blade being fastened at its either end, means for controlling the tension of said blade, and additional means for exerting greater tension at the edges of said blade than at the center portions thereof.

6. The combination with a continuous saw blade of a saw bearing arm having a contact face adapted to engage and position said blade, said contact face having a varied surface to exert different pressures at different points against said blade.

7. The combination with a continuous saw blade, of a rack, a saw-bearing arm mounted in said rack, and a hook on the end of said arm for the reception of said continuous blade, said hook having a curved inner face engaging the side of said blade.

8. In a gangsaw having a rack, the combination with a continuous saw blade, of a saw-bearing arm in said rack, and a pillar on the end of said arm for the reception of said continuous saw blade, said pillar having a concave inner face adapted to engage the side of said blade.

PIERRE DE VITRY D'AVAUCOURT.